United States Patent
Salter et al.

(10) Patent No.: US 11,458,914 B2
(45) Date of Patent: *Oct. 4, 2022

(54) METHOD OF ONBOARD AC POWER GENERATION FOR VEHICLES WITH COMBUSTION ENGINE

(71) Applicant: FORD GLOBAL TECHNOLOGIES, LLC, Dearborn, MI (US)

(72) Inventors: Stuart C. Salter, White Lake, MI (US); Zeljko Deljevic, Plymouth, MI (US); Phillip M. Marine, Royal Oak, MI (US); Daniel J. Martin, Plymouth, MI (US); William C. Taylor, Ypsilanti, MI (US); Hanyang B. Chen, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 15 days.

This patent is subject to a terminal disclaimer.

(21) Appl. No.: 17/205,261

(22) Filed: Mar. 18, 2021

(65) Prior Publication Data
US 2021/0197745 A1 Jul. 1, 2021

Related U.S. Application Data

(63) Continuation of application No. 16/514,015, filed on Jul. 17, 2019, now Pat. No. 11,001,213.

(51) Int. Cl.
*B60R 16/033* (2006.01)
*B60Q 1/26* (2006.01)
*B60J 1/00* (2006.01)

(52) U.S. Cl.
CPC ............. *B60R 16/033* (2013.01); *B60Q 1/26* (2013.01); *B60J 1/002* (2013.01)

(58) Field of Classification Search
CPC ....... B60R 16/033; B60R 16/03; B60R 16/04; B60R 16/0315; B60Q 1/26
See application file for complete search history.

(56) References Cited

U.S. PATENT DOCUMENTS

| | | |
|---|---|---|
| 4,044,293 A | 8/1977 | Follmer |
| 6,215,277 B1 | 4/2001 | Renehan |
| (Continued) | | |

FOREIGN PATENT DOCUMENTS

DE 3812577 A1 10/1989

OTHER PUBLICATIONS

Guide to Successful Dual Voltage Systems, Waytek, Inc., Undated.

*Primary Examiner* — Patrick C Chen
(74) *Attorney, Agent, or Firm* — Frank L. Lollo; MacMillan, Sobanski & Todd, LLC (57) ABSTRACT

An AC inverter in a vehicle operates using a 24 V input when a vehicle powertrain is in a parked/idling state. A first 12 V battery is connected with a first bus segment. A second 12 V battery is connected with a second bus segment. A switch module selectably interconnects the first and second bus segments. In a nominal 12 V state, the batteries are connected in parallel from the bus segments to ground. In a dual voltage state, the batteries are connected in series so the first bus segment is at 12 V and the second bus segment is at 24 V. A first alternator driven by the powertrain provides a regulated voltage to the second bus segment, wherein the regulated voltage corresponds to 12 V when the switch module is in the nominal state and corresponds to 24 V when the switch module is in the dual voltage state.

18 Claims, 5 Drawing Sheets

(56) References Cited

U.S. PATENT DOCUMENTS

| | | | |
|---|---|---|---|
| 6,218,643 B1* | 4/2001 | Iwata | F01N 3/2013 |
| | | | 219/508 |
| 6,930,404 B1 | 8/2005 | Gale et al. | |
| 2005/0118465 A1 | 6/2005 | Dubinin | |
| 2008/0223842 A1* | 9/2008 | Petrenko | H05B 3/84 |
| | | | 219/203 |
| 2016/0090054 A1 | 3/2016 | Powell | |
| 2016/0137092 A1* | 5/2016 | Thieme | B60R 16/03 |
| | | | 307/10.6 |
| 2019/0165710 A1 | 5/2019 | Judge et al. | |

* cited by examiner

METHOD OF ONBOARD AC POWER GENERATION FOR VEHICLES WITH COMBUSTION ENGINE

CROSS REFERENCE TO RELATED APPLICATIONS

This application is a continuation of U.S. application Ser. No. 16/514,015, filed Jul. 17, 2019, entitled "Onboard AC Generator for Power-To-The-Box In Vehicles With Combustion Engines," which issued as U.S. Pat. No. 11,001,213 on May 11, 2021, and which is incorporated herein by reference in its entirety.

STATEMENT REGARDING FEDERALLY SPONSORED RESEARCH

Not Applicable.

BACKGROUND OF THE INVENTION

The present invention relates in general to generating AC power in a combustion engine vehicle for use by AC accessories, and, more specifically, to a reconfigurable DC electrical system for meeting increased AC power demands when a vehicle is parked.

Cars, trucks, and other motor vehicles driven by internal combustion engines have typically employed an electrical system based on a DC voltage at about 12 volts. The DC power is derived from a storage battery (nominally at 12V) and an alternator. The alternator is driven by the engine and controlled by a voltage regulator that varies the alternator output to recharge the battery and maintain a desired voltage on a DC bus that connects to various DC loads (e.g., a starter motor). The nominal voltage as used herein refers to a voltage classification. The actual voltages can vary from the nominal values. For example, the open-circuit resting voltage of a 12V battery can be about 12.7V and for charging purposes the output of a 12V regulator can be up to about 14.5V. Two batteries nominally providing 12V each may be connected in series to provide a high DC voltage. The high DC voltage is referred to herein as having a nominal 24 volts, although the open circuit voltage of the batteries and a target voltage for an alternator that charges the series-connected batteries are higher.

Pickup trucks in particular may be used in ways that demand large amounts of electrical power—both during driving and while parked. Some large electrical loads include electric power assisted steering (EPAS) actuators and electric brake boosters (EBB). In addition, trucks are often fitted with additional equipment, such as a snowplow, with very high DC power requirements. The alternator and battery that supply the DC power must be large enough to meet the demand. In order to take advantage of existing (i.e., mass-produced) alternator products and to make best use of the available space in an engine compartment, two or more separate alternators connected in parallel can be used (which avoids using an especially large alternator and allows the separate alternators to be arranged at opposite sides of the engine). Sometimes, two or more batteries connected in parallel are also used in order to provide greater capacity when the engine is not running and to handle power transients (e.g., surges or drops) when the engine is running (especially with diesel engines).

In order to facilitate the use of portable electric devices, vehicles typically include one or more power points in the form of sockets into which the portable devices can be plugged-in to receive power. When first introduced, the power points were designed to supply the same 12VDC as used by the fixed vehicle loads. More recently, DC/AC inverters have been introduced into vehicles for supplying 110V 60-cycle AC to power points configured to accept standard wall plugs (as used in buildings). As a result, portable devices that can be electrically powered include AC loads such as laptops, entertainment devices, battery chargers, and power tools. The AC power outlets may be located in a passenger compartment, cargo compartment, or bed of a truck. The feature is sometimes referred to as Power-to-the-Box (PttB).

In connection with work trucks, emergency vehicles, and other heavy-duty vehicles, it is desirable for the AC inverter to have a steady state output capacity of 2 kW with a surge capacity up to 4 kW. To obtain this level of output power together with reasonable efficiency, it is preferable to utilize an input voltage to the inverter higher than the 12V available from the standard DC bus. Therefore, a separate DC bus operating at a nominal 24 VDC has been used wherein an auxiliary 24V battery and auxiliary 24V alternator are connected to the separate bus to supply power exclusively to a DC/AC inverter. Providing a duplicate battery and alternator just for the AC power outlet(s), however, can result in significant manufacturing costs. In addition, packaging space for another alternator may be unavailable or difficult to provide.

SUMMARY OF THE INVENTION

In one aspect of the invention, a vehicle apparatus comprises a powertrain system having a parked/idling state. A first battery provides a nominal DC voltage between respective positive and negative terminals, wherein the positive terminal is connected with a first bus segment. A second battery provides the nominal DC voltage between respective positive and negative terminals, wherein the positive terminal is connected with a second bus segment. An AC inverter has a parked/idling mode that generates AC power at an outlet when a high DC voltage greater than the nominal DC voltage is supplied to an input of the AC inverter. A switch module selectably interconnects the first and second bus segments, wherein the switch module has a nominal state in which each battery has the respective negative terminal connected to a circuit ground, and wherein the switch module has a dual voltage state in which the negative terminal of the second battery is connected to the positive terminal of the first battery. A first alternator driven by the powertrain system provides a regulated voltage to the second bus segment. The regulated voltage corresponds to the nominal DC voltage when the switch module is in the nominal state and corresponds to the high DC voltage when the switch module is in the dual voltage state.

DETAILED DESCRIPTION OF PREFERRED EMBODIMENTS

Figure 1:
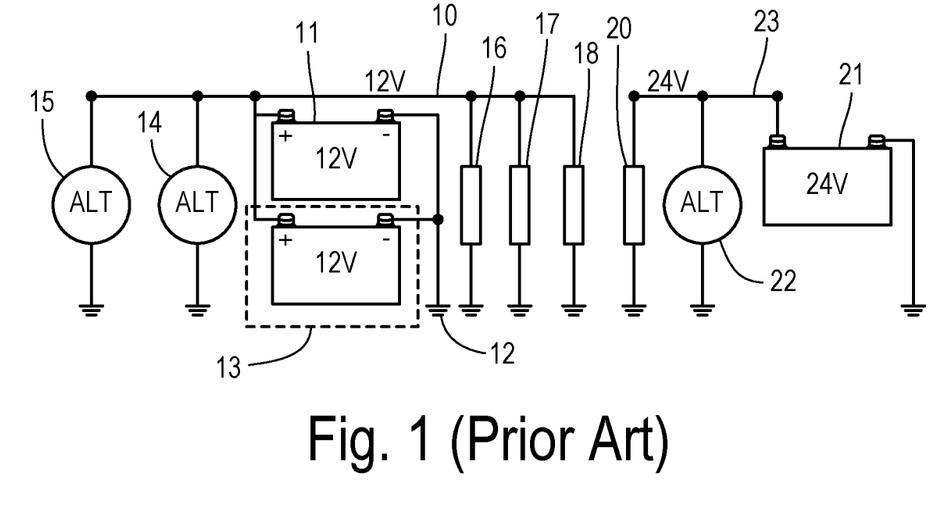
FIG. 1 is a block diagram showing a prior art electrical system.

FIG. 1 shows certain elements of the vehicle electrical system wherein a 12V bus 10 is powered by at least one 12V battery 11 connected between bus 10 and a circuit ground 12. One or more optional batteries 13 may also be connected between bus 10 and circuit ground 12 to increase storage capacity and for other reasons. For example, some diesel engines may utilize two or more batteries in order to obtain reliable engine starting.

A pair of 12V alternators 14 and 15 are also connected between bus 10 and ground 12. An enhanced electrical power supply capability is obtained, as is particularly useful in a work truck having a variety of DC loads. The DC loads include conventional low-power loads 16 (such as electronic controllers, climate control components, audio components, lighting, and other accessories) common to all types of vehicles, together with high-power loads including an EPAS system 17 and a snowplow actuator 18.

Even though the electrical system containing multiple batteries and multiple alternators operating in parallel provides enhanced capacity, it has been previously necessary to further duplicate components in order to operate a high-power AC inverter 20. In particular, a battery 21 and an alternator 22 each rated at a nominal 24V are connected to separate bus 23. The separate 24V system can be activated as necessary for energizing the AC power outlet(s).

Figure 2:
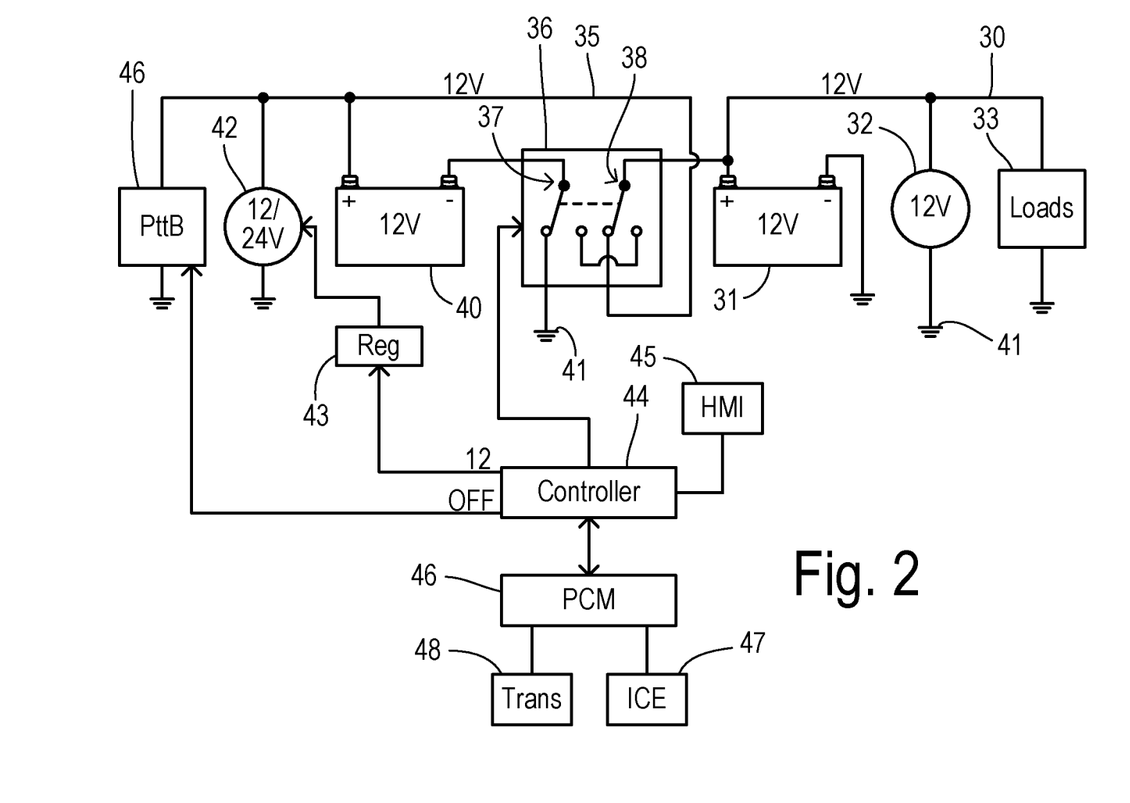
FIG. 2 is a schematic, block diagram of an electrical system according to one preferred embodiment with a switch module in a nominal state.

FIG. 2 shows an improved system for providing sufficient capacity to operate a high power (e.g., 2 kW to 4 kW) AC inverter without requiring the additional alternator of the architecture shown in FIG. 1. The arrangement of FIG. 2 can power all the 12V loads that operate during a normal driving cycle and then reconfigures to support AC power generation and continued operation of certain DC loads when the vehicle is parked and idling. This meets the user's needs since high power AC loads (e.g., power tools) would typically only be used when the vehicle is parked.

A first bus segment 30 continuously receives a nominal voltage of 12V from a battery 31 and an alternator 32. A set of regular DC loads 33 is connected to bus 30. A second bus segment 35 is selectably interconnected with first bus segment 30 via a switch module 36. Switch module 36 can be implemented using well-known devices including MOSFETs, IGBTs, or mechanical relays to provide double-pole double-throw switches 37 and 38. An input of switch 38 is connected to first bus segment 30. An input of switch 37 is connected to the negative terminal of a second battery 40 which provides 12 V nominally and which has its positive terminal connected to second bus segment 35. FIG. 2 shows switch module 36 configured in a nominal state wherein the input of switch 38 is connected to an output directly connected to second bus segment 35. In the nominal state, the input of switch 37 is connected to an output of switch 37 that is tied to a circuit ground 41. As a result, bus segments 30 and 35 are directly connected and are directly connected while batteries 31 and 40 and alternators 32 and 42 are placed in parallel from bus segments 30/35 to circuit ground 41.

In this embodiment, alternator 42 is switchable between operating as either a 12V alternator or a 24V alternator. In the nominal state of FIG. 2, it operates as a 12V alternator. Alternator 42 is designed with a capacity to support 24V operation (to be used in connection with operating the AC inverter as described below) when a corresponding current is supplied to the magnetic field coils of its rotor. In the nominal state of switch module 36, alternator 42 is regulated to a nominal 12-volts using a lower current to the field coils (resulting in nominal 12V operation equivalent to the 12V portion of FIG. 1). A regulator 43 is connected to alternator 42 for controlling the field current in response to a control signal from a controller 44. Either 12-volt or 24-volt operation is commanded by controller 44 based on input signals from a human machine interface (HMI) 45 and a powertrain control module (PCM) 46.

HMI 45 may include a selection button or menu in order for a user to generate an On command or and Off command to selectably activate an AC inverter 46 (i.e., a power-to-the-box or PttB unit). Powertrain control module 46 is coupled to an internal combustion engine 47 and a transmission controller 48 as well known in the art. Controller 44 permits operation of AC inverter 46 in a high power mode only when the powertrain system is in a parked and idling state (as determined by command and control data exchanged by PCM 46 with engine 47 and transmission 48). Unless the vehicle is in the parked/idling state and the user has requested high-power AC inverter operation, switch module is placed by controller 44 into the nominal state of FIG. 2. In addition, controller 44 configures regulator 43 into a 12-volt mode so that the field current in alternator 42 is regulated in a manner that provides nominal 12V on second bus segment 35 (while also commanding AC inverter 46 to be in an Off state).

When the powertrain system is in the parked/idling state, the user can manipulate HMI 45 to initiate the turning on of the AC inverter for providing AC power to an outlet power point such as a power-to-the-box unit in a truck bed, for example. Accordingly, controller 44 reconfigures switch module 36 into a dual voltage state shown in FIG. 3. In the dual voltage state, switch 38 has its input connected to its second output which is connected directly to a second output of switch 37. Since the input of switch 37 is connected with the negative terminal of battery 40, positive terminal of battery 31 becomes interconnected with the negative terminal of battery 40. Batteries 40 and 31 are connected in series between bus segment 35 and circuit ground 41 so that bus segment 35 receives a nominal 24V power level. AC inverter 46 can be turned on by controller 44 so that it generate AC power efficiently based on a 24V input. In addition, controller 44 commands regulator 43 to regulate alternator 42 at a full 24V mode.

Figure 3:
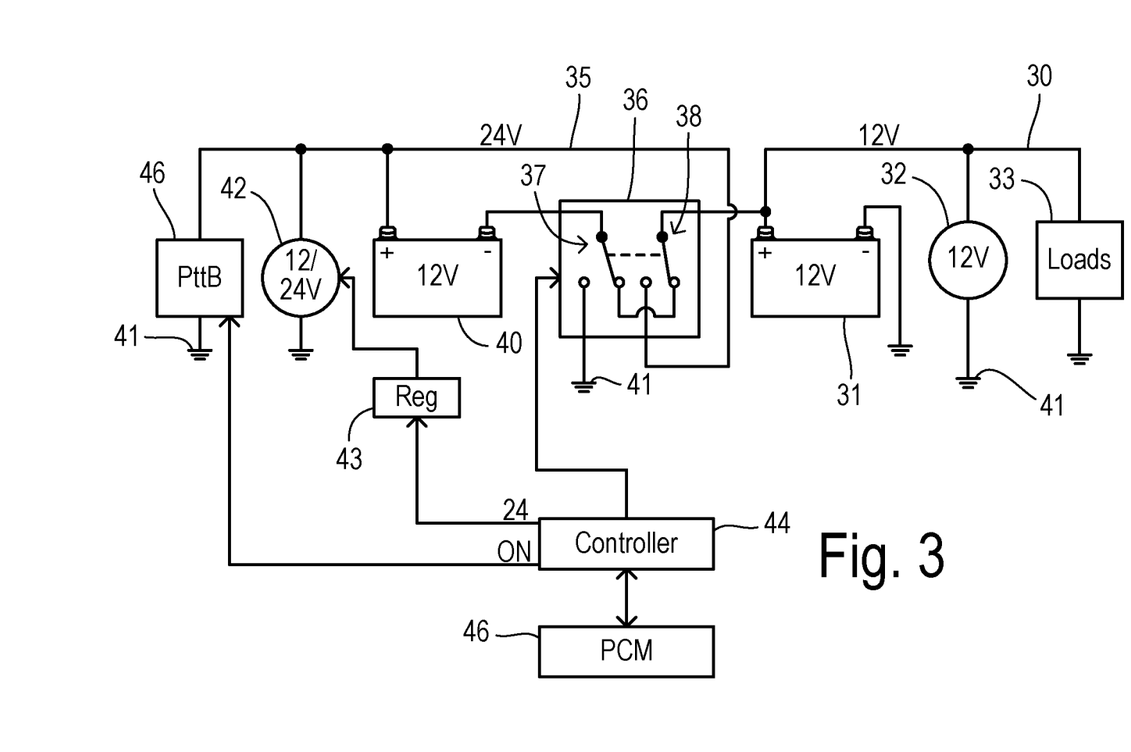
FIG. 3 is a schematic, block diagram of the electrical system of FIG. 2 with the switch module in a dual voltage state for supplying power to an AC inverter.

When in the dual voltage state (e.g., while parked and idling at 1600 RPM), the dual voltage alternator 42 handles the power for AC inverter 46 while standard 12V alternator 32 handles the power for the normal 12V loads (e.g., air conditioning, heated seat, etc.). If desired, certain DC loads that would not be needed while in Park could be disconnected to avoid unnecessary power drain.

When switching between the nominal state and the dual voltage state, it is preferable to follow a transition sequence that minimizes the occurrence and impact of undesirable voltage transients. When a decision is made to change the state of the electrical system, controller 44 first issues signals via various vehicle multiplex networks (e.g., CAN and LIN) to shut down unneeded electronics/control modules and to deactivate other loads not needed during the transition. Then the alternator field currents are reduced (e.g., reduced to zero) so that reduced power is generated in the alternators. Then the state of switch module 36 can be toggled, followed by restoring the alternator field currents to achieve the targeted (i.e., regulated) voltages and then the activation or deactivation of the AC inverter.

Figure 4:
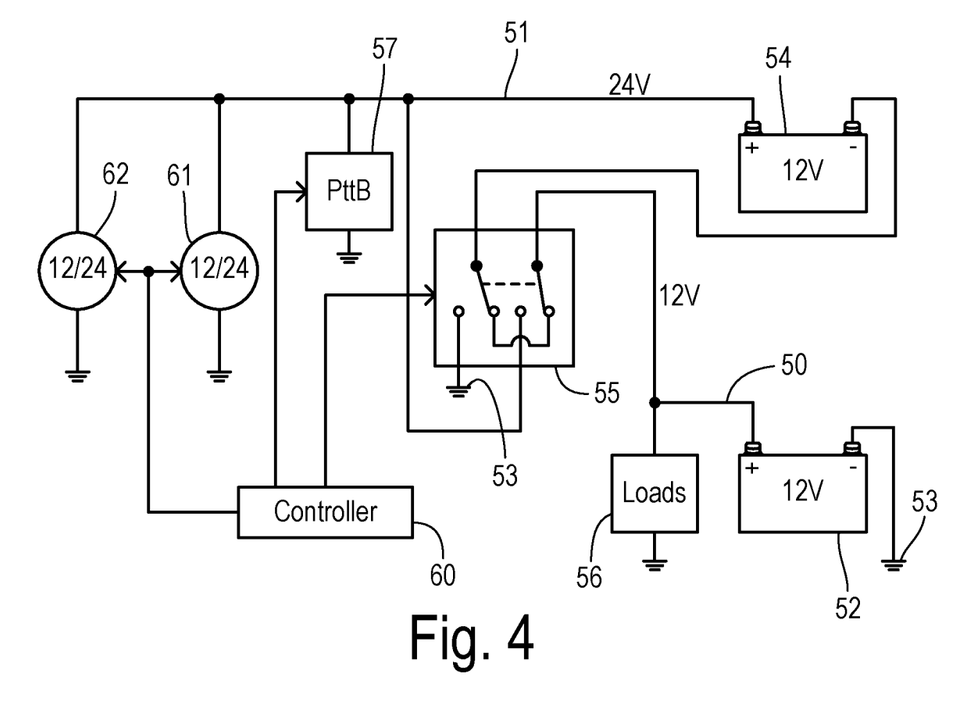
FIG. 4 is a schematic, block diagram of another embodiment of an electrical system, wherein a switch module is in a dual voltage state.

FIG. 4 shows an alternative embodiment of the invention which can further increase the power supply capability without further increasing the number of alternators used. A first bus segment 50 and a second bus segment 51 are selectably interconnected using a switch module 55. First bus 50 is coupled to circuit ground 53 by a battery 52 (making first bus segment 50 a 12-volt bus). Normal DC loads 56 are powered by bus 50.

Second bus segment 51 is connected to a positive terminal of a battery 54 with a nominal voltage of 12V. The negative terminal of battery 54 is connected to the input of one of the ganged, double-pole double-throw switches in switch module 55. FIG. 4 shows switch module 55 in the dual voltage state which connects the negative terminal of battery 54 with first bus segment 50, so that second bus segment 51 becomes a 24-volt bus. In the nominal state (not shown), switch module 55 connects the negative terminal of battery 54 to circuit ground 53 and directly connects bus segments 50 and 51 together.

An AC inverter 57 is coupled to second bus segment 51 and is controlled by a controller 60. Controller 60 further controls a pair of alternators 61 and 62 which have their outputs connected to second bus segment 51. Alternators 61 and 62 are both operated in either a 12V mode or a 24V mode simultaneously, depending on whether second bus segment 51 is operating at 12V or 24V. In this configuration, alternators 61 and 62 both support power delivery to AC inverter 57. The recharging of both batteries 52 and 54 and power delivery to loads 56 are also handled by power delivery from alternators 61 and 62.

Figure 5:
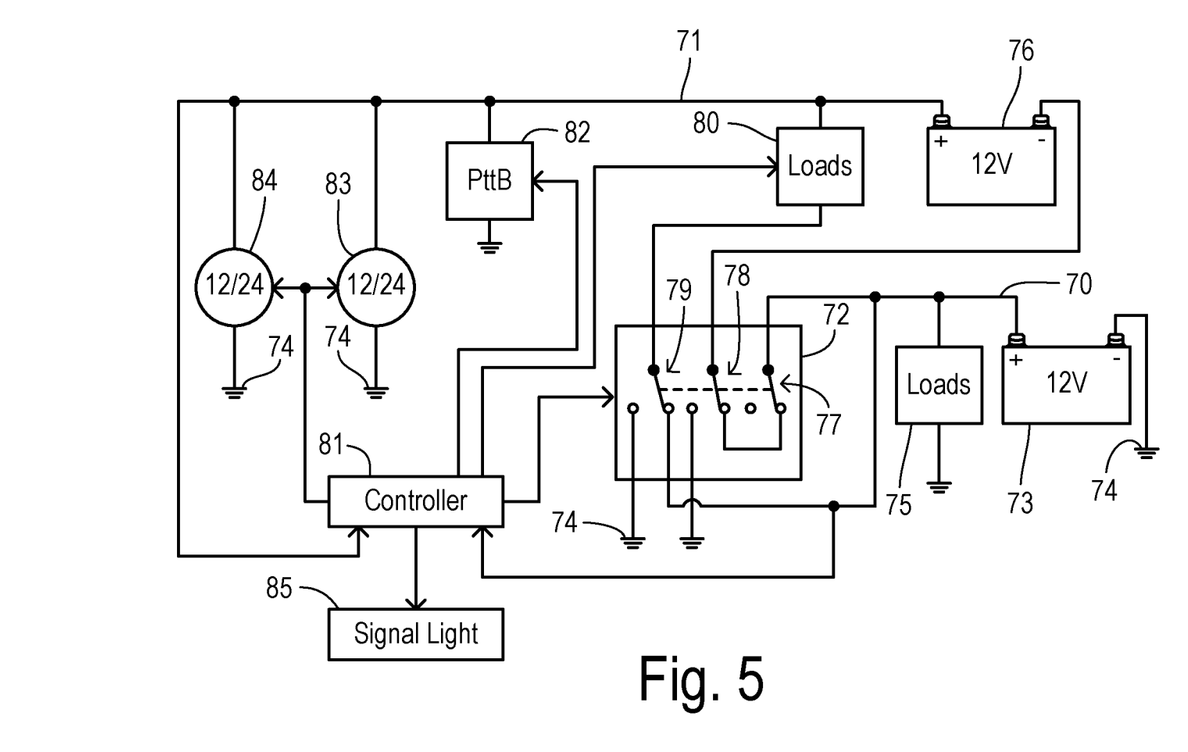
FIG. 5 is a schematic, block diagram of another embodiment of an electrical system of the invention wherein sets of 12V DC loads are separately connected to high and low voltage bus segments in order to provide load balancing.

Since alternators 61 and 62 in FIG. 4 simultaneously deliver power to batteries 52 and 54 (in series) and to loads 56 only through the recharging current of battery 54, load imbalances between the power drawn by AC inverter 57 compared to loads 56 may result in unequal states of charge between batteries 52 and 54. In order to improve charge balancing, an embodiment as shown in FIG. 5 can be used. A first bus segment 70 and a second bus segment 71 are selectably interconnected using a switch module 72. First bus 70 is coupled to circuit ground 74 by a battery 73 (making first bus segment 70 a 12-volt bus). A first set of DC loads 75 is powered by bus 70.

Second bus segment 71 is connected to a positive terminal of a battery 76 with a nominal voltage of 12V. The negative terminal of battery 76 is connected to the input of a switch 78 (which is one of the ganged, double-pole double-throw switches in switch module 72). FIG. 5 shows the dual voltage state which connects the negative terminal of battery 76 with first bus segment 70 (so that second bus segment 71 becomes a 24-volt bus). In the nominal state (not shown), switch 78 connects the negative terminal of battery 76 to circuit ground 74. In this embodiment, bus segments 70 and 71 are isolated when in the nominal state.

A second set of DC loads 80 is between second bus segment 71 and the input of a switch 79 in switch module 72. Switch 79 connects the lower-voltage side of loads 80 to circuit ground 74 in the nominal state and to the positive terminal of battery 73 (i.e., to first bus segment 70) in the dual voltage state. In the dual voltage state, loads 80 provide an alternate current path from alternators 83/84 to first bus segment 70 (e.g., for charging battery 73). For improved load balancing, loads 80 may be adjustable by controller 81 as described below.

An AC inverter 82 is coupled to second bus segment 71 and is controlled by a controller 81. Controller 81 further controls a pair of alternators 83 and 84 which have their outputs connected to second bus segment 71. Alternators 83 and 84 are both operated in either a 12V mode or a 24V mode simultaneously, depending on whether second bus segment 71 is operating at 12V or 24V. Controller 81 is further connected to an indicator 85 (such as an exterior signal light) which can be illuminated according to whether the PttB unit is active. Steady illumination can be used to indicate normal operation, and a flashing illumination can be used to indicate that a fault has occurred.

By separating the DC loads into sets 75 and 80, the states of charge of batteries 73 and 76 can be maintained more nearly equal. The specific DC loads that are included within balancing loads 80 are preferably selected in order to 1) increase the likelihood that the power draw of load sets 80 and 75 are approximate equal, and 2) minimize extra wiring costs. Balancing the power draw helps keep the midpoint voltage on first bus segment 70 at close to one-half of the voltage on second bus segment 71. In regard to wiring, it becomes necessary to remove the direct connections of each of the balancing loads 80 to the vehicle sheet metal which usually provides the circuit ground so that the low voltage side of loads 80 can be selectably connected to either the circuit ground (for the nominal state) or to the mid-point voltage on bus segment 70 between batteries 73 and 76 (for the dual voltage state). To reduce added wiring, relatively large loads may be selected so that fewer components need the extra wiring. The large loads may include glow plugs, diesel exhaust fluid heaters, on-glass window heaters, and windshield wiper parking heaters.

In addition, specific loads selected to be included in balancing loads 80 may preferably include loads that are able to be operated with a variable input power. This allows real-time adjustment of the voltage drop across loads 80, providing an ability to regulate the voltage on first bus segment 70. Loads associated with heating a portion of the vehicle (once again the glow plugs, diesel exhaust fluid heaters, on-glass window heaters, and windshield wiper parking heaters) are preferred since it is possible to limit the power delivered to these loads using pulse-width modulation (PWM). A PWM duty cycle can be adjusted upward or downward to either increase or decrease the midpoint voltage. In FIG. 5, controller 81 is connected to monitor voltages on bus segments 70 and 71 is order to compare the midpoint voltage on bus 70 to a value that is one-half of the voltage on bus segment 71.

When the dual voltage state is initiated, second set of loads 80 are initially set to a reduced power consumption (e.g., using a PWM duty cycle of 80%). Controller 81 checks whether the midpoint voltage is within a predetermined offset of a target voltage (defined to be one-half of the measured voltage on the high voltage bus). If so, then no further adjustment is needed. If the midpoint voltage is less than the target voltage with offset, then the PWM duty cycle is increased by a predetermined step size (e.g., 1%). Raising the PWM duty cycle slightly raises the charge voltage to battery 73. The predetermined offset and the step size are preferably chosen to provide hysteresis in the control loop.

If the midpoint voltage is greater than the target voltage with offset, then the PWM duty cycle is decreased by the predetermined step size. Lowering the duty cycle slightly lowers the charge voltage to battery 73. Consequently, the states of charge of batteries 73 and 76 can be optimized while the PttB unit is engaged.

What is claimed is:

1. A method of distributing electrical power in a vehicle with a vehicle powertrain system, the method comprising the steps of:
   monitoring the powertrain system to detect a parked/idling state;
   receiving a user command for selectably activating an AC inverter mounted in the vehicle;
   in response to receiving the user command while the parked/idling state is detected:
   1) driving a switch module from a nominal state to a dual voltage state, wherein the vehicle includes a first battery providing a nominal DC voltage between respective first positive and negative terminals, wherein the first positive terminal is connected with a first bus segment, wherein the vehicle includes a second battery providing the nominal DC voltage between respective second positive and negative terminals, wherein the second positive terminal is connected with a second bus segment, wherein the AC inverter has a parked/idling mode that generates AC power at an outlet when a high DC voltage greater than the nominal DC voltage is supplied to an input of the AC inverter, wherein the switch module selectably interconnects the first and second bus segments, wherein the nominal state of the switch module connects the respective negative terminals of each battery to a circuit ground, wherein the dual voltage state of the switch module connects the second negative terminal of the second battery to the first positive terminal of the first battery, and wherein a first alternator is driven by the powertrain system to provide a regulated voltage to the second bus segment;
   2) changing the regulated voltage from the nominal DC voltage to the high DC voltage; and
   3) actuating the AC inverter.

2. The method of claim 1 wherein the vehicle further includes a plurality of DC loads connected to the first bus segment so that the nominal DC voltage is continuously available to the plurality of DC loads.

3. The method of claim 2 further comprising the step of:
   driving a second alternator from the powertrain system, wherein the second alternator has an output connected to the first bus segment, and wherein the second alternator is continuously regulated according to the nominal DC voltage.

4. The method of claim 1 further comprising the step of:
   driving a second alternator from the powertrain system to provide the regulated voltage to the second bus segment in parallel with the first alternator.

5. The method of claim 1 wherein:
   a first plurality of DC loads are connected between the first bus segment and the circuit ground so that the nominal DC voltage is continuously available to the first plurality of DC loads; and
   a second plurality of DC loads are connected to the second bus segment and to the switch module, wherein the switch module connects the second plurality of DC loads between the second bus segment and the circuit ground in the nominal state, and wherein the switch module connects the second plurality of DC loads between the second bus segment and the first bus segment in the dual voltage state.

6. The method of claim 5 further comprising the steps of:
   monitoring a first voltage on the first bus segment and a second voltage on the second bus segment; and
   adjusting a total power consumption of the second plurality of DC loads during the dual voltage state to maintain the first voltage at substantially half of the second voltage.

7. The method of claim 6 wherein the second plurality of DC loads is comprised of at least one load for heating a portion of the vehicle.

8. The method of claim 6 wherein the second plurality of DC loads is comprised of at least one load adapted to have an input power that is pulse-width modulated in order to adjust its total power consumption.

9. The method of claim 1 further comprising the step of actuating an exterior lighting element when the AC inverter is actuated.

10. A method of distributing electrical power in a vehicle with a vehicle powertrain system, the method comprising the steps of:
    monitoring the powertrain system to detect a parked/idling state;
    receiving a user command for selectably activating an AC inverter mounted in the vehicle;
    in response to receiving the user command while the parked/idling state is detected:
    1) driving a switch module from a nominal state to a dual voltage state, wherein the vehicle includes a first battery providing a nominal 12 V output between respective first positive and negative terminals, wherein the first positive terminal is connected with a first bus segment, wherein the vehicle includes a second battery providing a nominal 12 V output between respective second positive and negative terminals, wherein the second positive terminal is connected with a second bus segment, wherein the AC inverter has a parked/idling mode that generates AC power at an outlet when a voltage of a nominal 24 V is supplied to an input of the AC inverter, wherein the switch module selectably interconnects the first and second bus segments, wherein the nominal state of the switch module connects the respective first and second negative terminals in each battery to a circuit ground, wherein the dual voltage state connects the second negative terminal of the second battery to the first positive terminal of the first battery, wherein the vehicle includes a first alternator driven by the powertrain system to provide a regulated voltage to the second bus segment, wherein the regulated voltage corresponds to 12 V when the switch module is in the nominal state;
    2) changing the regulated voltage of the first alternator from the nominal 12 V to the nominal 24 V; and
    3) actuating the AC inverter.

11. The method of claim 10 wherein the vehicle further includes a plurality of DC loads connected to the first bus segment so that the nominal 12 V referenced to the circuit ground is continuously available to the plurality of DC loads.

12. The method of claim 11 further comprising the step of:
    driving a second alternator from the powertrain system, wherein the second alternator is connected to the first bus segment, and wherein the second alternator is continuously regulated according to the nominal 12 V referenced to the circuit ground.

13. The method of claim 10 further comprising the step of:
    driving a second alternator from the powertrain system to provide the regulated voltage to the second bus segment in parallel with the first alternator, wherein the regulated voltage corresponds to 12 V when the switch module is in the nominal state and corresponds to 24 V when the switch module is in the dual voltage state.

14. The method of claim 10 wherein:

a first plurality of DC loads are connected between the first bus segment and the ground so that the nominal 12 V referenced to circuit ground is continuously available to the first plurality of DC loads; and a second plurality of DC loads are connected to the second bus segment and to the switch module, wherein the switch module connects the second plurality of DC loads between the second bus segment and the circuit ground in the nominal state, and wherein the switch module connects the second plurality of DC loads between the second bus segment and the first bus segment in the dual voltage state.

15. The method of claim 14 further comprising the steps of:

monitoring a first voltage on the first bus segment and a second voltage on the second bus segment; and adjusting a total power consumption of the second plurality of DC loads during the dual voltage state to maintain the first voltage at substantially half of the second voltage.

16. The method of claim 15 wherein the second plurality of DC loads is comprised of at least one load for heating a portion of the vehicle.

17. The method of claim 15 wherein the second plurality of DC loads is comprised of at least one load adapted to have an input power that is pulse-width modulated in order to adjust its total power consumption.

18. The method of claim 10 further comprising the step of actuating an exterior lighting element when the AC inverter is actuated.

* * * * *